(12) United States Patent
Jeong et al.

(10) Patent No.: US 9,109,692 B2
(45) Date of Patent: Aug. 18, 2015

(54) OIL PUMP CONTROLLING SYSTEM OF HYBRID VEHICLE AND METHOD THEREOF

(71) Applicants: Hyundai Motor Company, Seoul (KR); Kia Motors Corporation, Seoul (KR)

(72) Inventors: Sanghyun Jeong, Gyeonggi-do (KR); Jong Hyun Kim, Gyeonggi-do (KR); Seunghyun Yang, Gyeonggi-do (KR); Sang Lok Song, Gyeonggi-do (KR); Yeonho Kim, Gyeonggi-do (KR); Jaeshin Yi, Gyeonggi-do (KR); Haksung Lee, Gyeonggi-do (KR); Seung Ki Kong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/267,360

(22) Filed: May 1, 2014

(65) Prior Publication Data
US 2014/0244087 A1 Aug. 28, 2014

Related U.S. Application Data

(62) Division of application No. 13/177,706, filed on Jul. 7, 2011, now Pat. No. 8,747,074.

(30) Foreign Application Priority Data

Dec. 7, 2010 (KR) ......................... 10-2010-0124357

(51) Int. Cl.
*F04B 17/03* (2006.01)
*F04B 49/06* (2006.01)
(Continued)

(52) U.S. Cl.
CPC .............. *F16H 61/0025* (2013.01); *B60K 6/48* (2013.01); *B60W 10/02* (2013.01); *B60W 10/06* (2013.01); *B60W 10/08* (2013.01); *B60W 10/30* (2013.01); *B60W 20/00* (2013.01); *B60W 30/18018* (2013.01); *F04B 17/03* (2013.01); (Continued)

(58) Field of Classification Search
CPC ........ F04B 49/002; F04B 49/20; F04B 49/08; F04B 17/03; F04B 49/06; F04B 2205/14; F04B 2205/06
See application file for complete search history.

(56) References Cited

U.S. PATENT DOCUMENTS

| 6,253,137 B1 | 6/2001 | Abo et al. |
| 6,840,889 B2 | 1/2005 | Aoki et al. |
| 2009/0118878 A1 | 5/2009 | Park |

FOREIGN PATENT DOCUMENTS

| JP | 2001-020773 A | 1/2001 |
| JP | 2004-084928 A | 3/2004 |

(Continued)

*Primary Examiner* — Bryan Lettman
(74) *Attorney, Agent, or Firm* — Mintz Levin Cohn Ferris Glovsky and Popeo, P.C.; Peter F. Corless

(57) ABSTRACT

An oil pump control apparatus of a hybrid vehicle is provided that controls an oil pump according to a demand of an output torque and oil temperature. In particular, hydraulic line pressure is controlled by operating an oil pump at maximum power if a starting demand for a hybrid vehicle is detected. Viscosity is calculated as well to correspond to an oil temperature in an engine stop mode and a rotation speed of the oil pump is controlled at a low power. Additionally, viscosity is also calculated according to a variation of a line pressure in a driving mode and the rotation speed of the electric oil pump is controlled in either a low power, a middle power, and a high power state as well.

8 Claims, 2 Drawing Sheets

(51) Int. Cl.
  *F04B 49/20* (2006.01)
  *F16H 61/00* (2006.01)
  *B60K 6/48* (2007.10)
  *B60W 10/02* (2006.01)
  *B60W 10/06* (2006.01)
  *B60W 10/08* (2006.01)
  *B60W 10/30* (2006.01)
  *B60W 20/00* (2006.01)
  *B60W 30/18* (2012.01)
  *F04B 35/04* (2006.01)
  *F04B 49/00* (2006.01)
  *F04B 49/08* (2006.01)
  *F16H 59/72* (2006.01)

(52) U.S. Cl.
  CPC .............. *F04B 35/04* (2013.01); *F04B 49/002* (2013.01); *F04B 49/06* (2013.01); *F04B 49/08* (2013.01); *F04B 49/20* (2013.01); *F16H 61/0021* (2013.01); *F16H 61/0031* (2013.01); *B60K 2006/4825* (2013.01); *B60W 2510/0291* (2013.01); *B60W 2510/107* (2013.01); *B60W 2510/108* (2013.01); *B60W 2710/1083* (2013.01); *B60W 2710/305* (2013.01); *B60Y 2200/92* (2013.01); *B60Y 2300/192* (2013.01); *F16H 59/72* (2013.01); *F16H 61/0028* (2013.01); *F16H 2312/20* (2013.01); *Y02T 10/6221* (2013.01); *Y02T 10/6252* (2013.01); *Y02T 10/6286* (2013.01); *Y02T 10/84* (2013.01); *Y10S 903/903* (2013.01)

(56) References Cited

FOREIGN PATENT DOCUMENTS

| | | |
|---|---|---|
| JP | 2005-207491 A | 8/2005 |
| JP | 2005-265167 A | 9/2005 |
| JP | 2007-186154 A | 7/2007 |
| JP | 2007186154 A | 7/2007 |
| JP | 2008-208967 A | 9/2008 |
| JP | 2008208967 A | 9/2008 |
| JP | 2009-096326 A | 5/2009 |
| JP | 2009-185915 A | 8/2009 |
| JP | 2009185915 A | 8/2009 |
| JP | 2009-262749 A | 11/2009 |
| KR | 10-2009-0045990 A | 5/2009 |
| KR | 10-2010-0062271 | 6/2010 |
| KR | 10-2010-0062635 A | 6/2010 |

OIL PUMP CONTROLLING SYSTEM OF HYBRID VEHICLE AND METHOD THEREOF

CROSS-REFERENCE TO RELATED APPLICATION

This application is a Divisional of U.S. patent application Ser. No. 13/177,706, filed Jul. 7, 2011, which claims priority to and the benefit of Korean Patent Application No. 10-2010-0124357 filed in the Korean Intellectual Property Office on Dec. 7, 2010, the entire contents of which are incorporated herein by reference.

BACKGROUND OF THE INVENTION (a) Field of the Invention

The present invention relates to a hybrid vehicle. More particularly, the present invention relates to an oil pump control apparatus of a hybrid vehicle that controls an oil pump according to a demand for output torque and oil temperature, and a method thereof.

(b) Description of the Related Art

Demand for an environmentally-friendly vehicle has increased by reinforcement of exhaust gas regulations and enhancement of fuel efficiency concerns, and hybrid vehicles have been spotlighted as a realistic alternative.

A hybrid vehicle can be distinguished from a fuel cell vehicle and an electric vehicle in a narrow sense, and the hybrid vehicle in this specification can include a fuel cell vehicle and an electric vehicle in a broad sense and can designate a vehicle that has an engine and at least one high voltage battery and a motor that is operated by the battery. The engine and a motor are applied to a hybrid vehicle as power sources, and are appropriately combined according to driving conditions to enhance fuel efficiency and to reduce exhaust gas emission.

Hybrid vehicles improve fuel consumption efficiency by combining power from the engine and the motor when the engine and the motor are operated. Hybrid vehicles adopt a hybrid stop and go (HSG) function to automatically turn the engine on or off according to a driving conditions. Additionally, when the hybrid vehicle is in an electric vehicle (EV) mode, the engine may also be turned off to conserve fuel.

As described above, if the engine is turned off, a mechanical oil pump that is connected to a crankshaft of the engine to supply an automatic transmission of the vehicle with oil stops operating. Thus, hydraulic pressure is not properly supplied to the automatic transmission and a wet engine clutch as it should be. Accordingly, normal line pressure is not formed in the automatic transmission so that friction elements (clutches and brakes) realizing a forward first speed are released.

Typically, an electric oil pump is disposed in parallel with the mechanical oil pump to resolve the above problem in hybrid vehicles. This electric oil pump is configured to be operated independently from the engine and thus is typically able to supply the proper hydraulic pressure to the automatic transmission and the wet engine clutch.

However, when the engine is turned off by the HSG function, the electric oil pump must rotate at a high speed. Thus, the durability of these electric pumps is greatly deteriorated, the current of a battery is excessively spent, and the battery must be more frequently charged and discharged, thus affecting the durability of the battery.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides an oil pump control apparatus for a hybrid vehicle which optimally controls rotation speed of an electric oil pump while at the same time realizing a necessary line pressure. That is, the rotation speed of the electric oil pump is variably controlled by selecting necessary power so as to control an electric oil pump according to a line pressure corresponding to an oil temperature and a demanded torque.

A oil pump control apparatus of a hybrid vehicle may include an engine that is operated or not operated as a first power source depending on a driving mode and condition, a motor that is operated as a second power source by a 3-phase AC current supplied from an inverter to transfer output torque to a transmission and function as a generator to retrieve a regeneration energy during deceleration, an engine clutch that connects or disconnects the engine with the motor, a first oil pump that is disposed in a transmission to be connected to the motor, which is operated by the motor in a condition that the engine is turned off in an EV or HSG mode, and is operated by the engine power transferred from the engine clutch in an HEV mode to create a line pressure, an electric oil pump that is operated in a condition that the engine is turned off in an EV or HSG mode to form a hydraulic pressure in the transmission and the engine clutch, and a hybrid controller that controls the electric oil pump according to a line pressure based on a power (current and voltage) to variably control a rotation speed of the electric oil pump.

In one or more embodiments of the present invention, the hybrid controller may operate the electric oil pump at maximum power (current×voltage) to create line pressure if a driving signal is detected. Additionally, the hybrid controller may calculate the viscosity the oil according to the oil temperature in an engine stop mode and operate the electric oil pump at a low power state. Likewise, the hybrid controller may calculate the viscosity of oil in a driving mode, control an operating speed of the electric oil pump in either a low power, a middle power, or a high power state, and variably control an operating speed thereof according to the line pressure by adjusting the electric power appropriately. In performing the above operation, the hybrid controller may use vehicle speed, input torque, gear speed, inhibiter switch position, a line pressure learned value, real rotation speed, input current, input voltage, on/off operating time of the electric oil pump, and line pressure to calculate the viscosity of the oil. As a result, the hybrid controller may learn a viscosity of oil according to a driving condition to revise a map table for determining an operating speed of the electric oil pump.

An oil pump control method of a hybrid vehicle may include creating line pressure by operating the electric oil pump at maximum power (current×voltage) if the starting demand for a hybrid vehicle is detected. Then a viscosity is calculated to correspond to an oil temperature in an engine stop mode and a rotation speed of the electric oil pump is controlled in a low power state. Alternatively, viscosity is calculated according to variation of the line pressure in a driving mode and the rotation speed of the electric oil pump in either a low power, a middle power, or a high power state according to that viscosity.

An operating speed of the electric oil pump may be variably controlled by varying a power for operating the electric oil pump according to the line pressure in a driving mode. A vehicle speed, input torque, gear speed, inhibiter switch position, a line pressure learned value, real rotation speed, input current, input voltage, on/off duration time of the electric oil pump, and line pressure may be used to calculate the viscosity of oil.

As described above, a control signal of an electric oil pump is varied according to the line pressure so as to create line pressure corresponding to a demand torque according to an exemplary embodiment of the present invention, wherein the electric oil pump is operated with a necessary power (voltage×current) such that rotation speed of the electric oil pump is actively controlled, power consumption of a battery is reduced, and fuel consumption efficiency is improved.

The electric oil pump is operated based on electric power, and rotation speed of the electric oil pump is actively varied corresponding to the line pressure according to an exemplary embodiment of the present invention such that a target pressure is securely realized to offer optimized control.

DETAILED DESCRIPTION OF THE EMBODIMENTS

Hereinafter, in the following detailed description, only certain exemplary embodiments of the present invention have been shown and described, simply by way of illustration.

As those skilled in the art would realize, the described embodiments may be modified in various different ways, all without departing from the spirit or scope of the present invention, and the drawings and description are to be regarded as illustrative in nature and not restrictive.

Note that it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, plug-in hybrid electric vehicles, hydrogen-powered hybrid vehicles and other alternative hybrid vehicles. As referred to herein, a hybrid vehicle is a vehicle that has two or more sources of power, for example both gasoline-powered and electric-powered vehicles.

Figure 1:
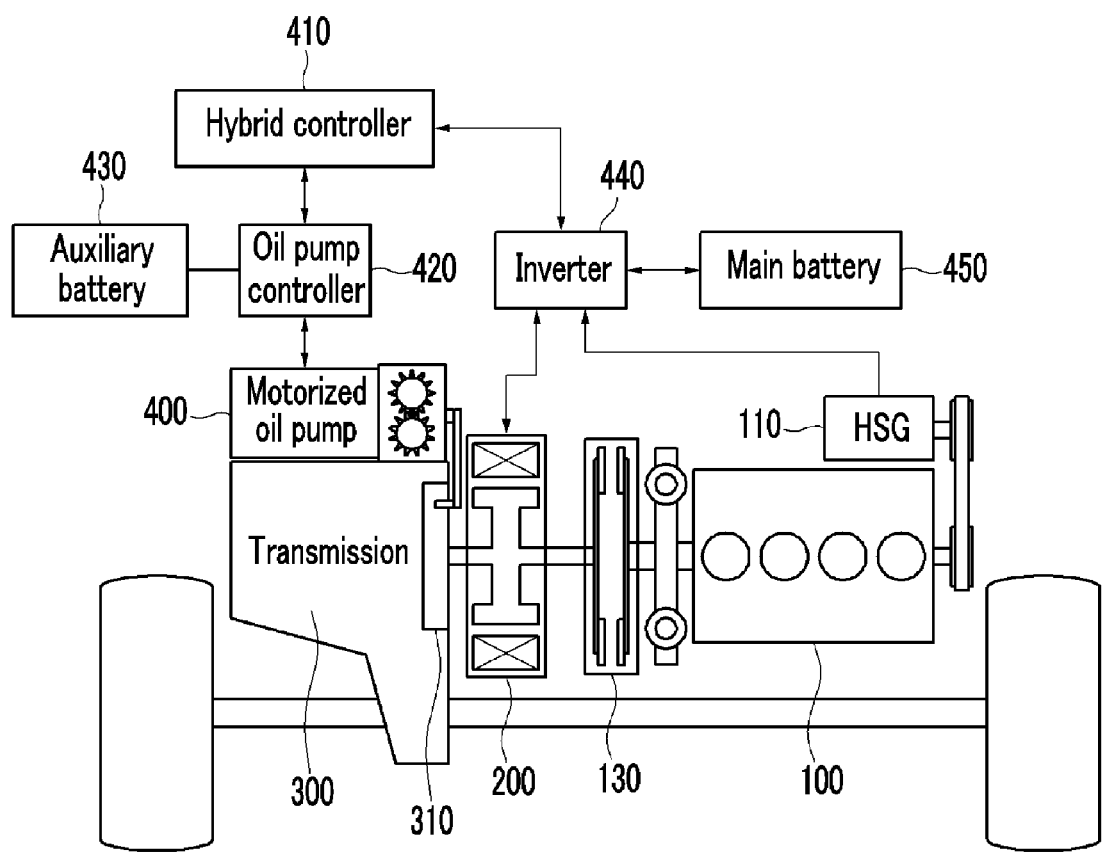
FIG. 1 is a drawing schematically showing an oil pump control apparatus of a hybrid vehicle according to an exemplary embodiment of the present invention.

FIG. 1 is a drawing schematically showing an oil pump control apparatus of a hybrid vehicle according to an exemplary embodiment of the present invention. Referring to FIG. 1, an exemplary embodiment of the present invention includes an engine 100, an HSG 110, an engine clutch 130, a motor 200, a transmission 300, a mechanical oil pump 310, an electric oil pump 400, a hybrid controller 410, an oil pump controller 420, an auxiliary battery 430, an inverter 440, and a main battery 450.

The engine 100 is operated as a first power source in a hybrid vehicle, and is on/off controlled depending during certain driving modes and in certain driving conditions. The engine 100 is turned off in an EV mode, is started in a HEV mode, and is on/off controlled depending on an HSG function. The HSG 110 starts or stops the engine 100 depending on the HSG function, and in a case that excess power of the engine 100 exists, the HSG 110 transforms the excess power into an electric voltage/current and the generated voltage/current is charged to the main battery 450 through the inverter 440. The engine clutch 130 is disposed between the engine 100 and the motor 200 to regulate power delivery, and in most cases a wet type of clutch is applied thereto to be operated by a hydraulic pressure supplied from the first oil pump 310 or the electric oil pump 400.

The motor 200 is a second power source in a hybrid vehicle, and is operated by a 3-phase AC current supplied from the inverter 440 to transfer output torque thereof to the transmission 300, generate a voltage by retrieving regeneration energy through braking (deceleration), and charge the main battery 450 through the inverter 400.

The transmission 300 can be either an automatic transmission or a CVT. A gear ratio thereof is changed according to a demand torque and driving conditions, and output torque that is added through the engine clutch 130 according to a driving mode is varied by the gear ratio to be transferred to a driving wheel.

The first oil pump 310 is disposed in the transmission 300 to be connected to an output shaft of the motor 200, is operated by the motor 200 when the engine 100 is turned off by the EV mode or the HSG function to create hydraulic pressure, and is operated by torque of the engine 100 supplied from the engine clutch 130 to create hydraulic pressure in the HEV mode. The first oil pump 310 includes a mechanical oil pump function that is operated by the engine 100 to create hydraulic pressure and an electric oil pump function that is operated by the motor 200 to create hydraulic pressure.

The electric oil pump 400 is operated when the engine 100 is turned off by the HSG function or the vehicle moves in the EV mode to form hydraulic pressure in the transmission 300 and the engine clutch 130. The hybrid controller 410 operates the electric oil pump (EOP, 400) with maximum power (current×voltage) to create line pressure, and learns the line pressure so as to be feedback controlled.

That is, the hybrid controller 410 operates the electric oil pump 400 at full power in the early stages, calculates an oil viscosity so as to correspond to an oil temperature in an engine stop mode, and determines power (current×voltage) for controlling the operating speed of the electric oil pump 400 to a low power state to control the operating speed of the electric oil pump 400.

Also, the hybrid controller 410 calculates an oil viscosity according to line pressure in a driving mode, and determines a power (current×voltage) for controlling the operating speed of the electric oil pump 400 to either a low power, a middle power, and a high power state so as to variably control the operating speed of the electric oil pump 400 against a sudden deceleration, a creep condition, etc. The hybrid controller 410 uses vehicle speed, input torque, gear speed, inhibiter switch position, a line pressure learned value, real rotation speed, input current, input voltage, on/off operating time of the electric oil pump 400, and line pressure to calculate the viscosity of the oil. The hybrid controller 410 learns the viscosity of the associated oil according to according to driving conditions to revise a map table for determining an operating speed of the electric oil pump 400.

The oil pump controller 420 uses electric power to operate the electric oil pump 400 by control of the hybrid controller 410, and variably controls the speed of the electric oil pump 400 according to a line pressure condition. The auxiliary battery 430 provides an electrical load to supply each controller with necessary power. The inverter 440 transforms DC voltage supplied from the main battery 450 to 3-phase AC voltage according to the control of the hybrid controller 410 to control the operating torque and speed of the motor 200. The inverter 440 charges the main battery 450 with a generated electric power that is formed when the motor 200 functions as a generator. The main battery 450 supplies the motor 200 with electric power to assist the output of the engine 100 in the HEV mode and stores the power generated from the motor 200.

Figure 2:
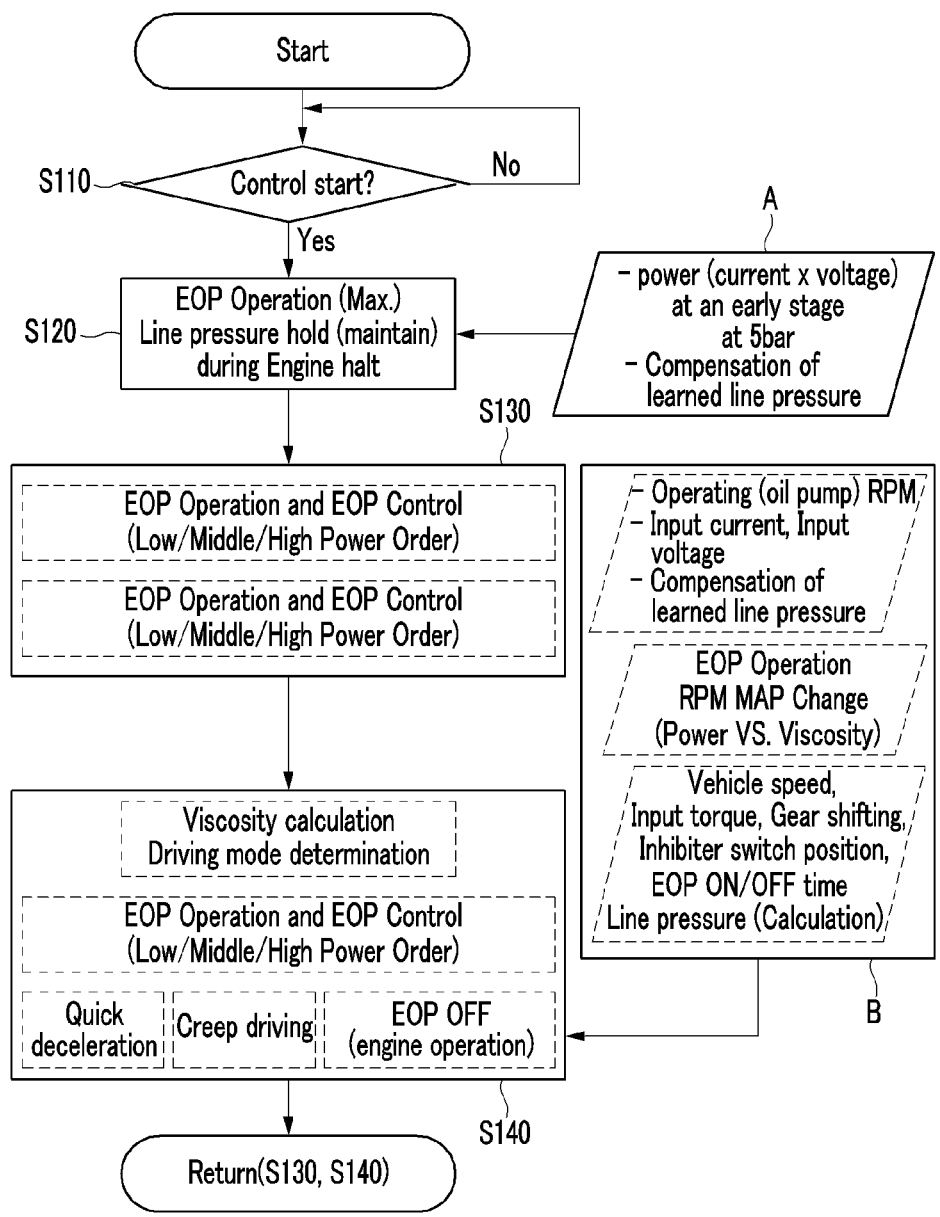
FIG. 2 is a flowchart showing procedures for oil pump control of a hybrid vehicle according to an exemplary embodiment of the present invention.

FIG. 2 is a flowchart showing procedures for oil pump control of a hybrid vehicle according to an exemplary embodiment of the present invention. The hybrid controller of the hybrid vehicle according to the present invention operates the electric oil pump 400 with maximum power (current× voltage) to quickly form early line pressure if a signal for starting the engine is detected in step S110, wherein the line pressure formed is learned to be feedback controlled in step S120.

As described above, after the electric oil pump 400 is operated with a maximum load at an initial stage, the oil viscosity is calculated so as to correspond to an oil temperature of the transmission 300, and the electric oil pump 400 is operated with a low power (current×voltage) in an engine stop mode to control the speed of the electric oil pump 400 in step S130.

Also, if the power is determined to operate the electric oil pump 400 in the engine stop mode, the oil viscosity is calculated in the driving mode, the power (current×voltage) for operating the electric oil pump 400 is determined as either a low power, a middle power, and a high power state to control the speed of the electric oil pump 400 against a quick deceleration, a creep condition, etc. in step S140. The vehicle speed, input torque, gear speed, inhibiter switch position, line pressure learned value, real rotation speed, input current, input voltage, on/off operating time of the electric oil pump 400, and line pressure to calculate the viscosity of oil are used to calculate the viscosity in the engine stop mode and the driving mode.

The steps S130 and S140 are repeated until the vehicle stops operating, i.e., an OFF signal is detected, and the map table determining the operating speed of the electric oil pump 400 can be revised by learning the viscosity that is calculated according to the driving condition.

Furthermore, the controllers described herein may be embodied as non-transitory computer readable media on a computer readable medium containing executable program instructions executed by a processor. Examples of the computer readable mediums include, but are not limited to, flash storage, ROM, RAM, magnetic tapes, floppy disks, and optical data storage devices. The computer readable recording medium can also be distributed in network coupled computer systems so that the computer readable media is stored and executed in a distributed fashion Advantageously, the present invention provides an electric oil pump which is actively varied corresponding to line pressure according so that a target pressure is securely realized to offer optimized while at the same time allowing for increased durability of both the electric pump and the battery due unnecessary rotational speed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: engine
200: motor
300: transmission
310: first oil pump
400: electric oil pump
410: hybrid controller
420: oil pump controller
440: inverter

What is claimed is:

1. A method for controlling an oil pump of a hybrid vehicle, comprising:
controlling a line pressure by operating the electric oil pump at a maximum power (current×voltage) in response to a starting demand for a hybrid vehicle being detected;
calculating a viscosity to correspond to an oil temperature in an engine stop mode and controlling a rotation speed of the electric oil pump in a low power state; and
calculating a viscosity according to a variation in the line pressure in a driving mode and controlling a rotation speed of the electric oil pump in either a low power, a middle power, or a high power state.

2. The oil pump control method of claim 1, wherein an operating speed of the electric oil pump is variably controlled by varying a power for operating the electric oil pump according to the line pressure in a driving mode.

3. The oil pump control method of claim 1, wherein a vehicle speed, an input torque, a gear speed, an inhibiter switch position, a line pressure learned value, a real rotation speed, an input current, an input voltage, an on/off duration time of the electric oil pump, and a line pressure are used to calculate the viscosity of oil.

4. An oil pump control apparatus of a hybrid vehicle, comprising:
an oil pump configured to be operated when an engine in the hybrid vehicle is turned off to create hydraulic pressure in a transmission and an engine clutch; and
a controller configured to control the electric oil pump according to a line pressure and a required power calculated by learning a current viscosity of oil to variably control a rotation speed of the oil pump depending upon driving conditions of the hybrid vehicle when in a driving mode.

5. The oil pump control apparatus of claim 4, wherein the controller operates the oil pump at maximum power to create line pressure if a driving signal is detected.

6. The oil pump control apparatus of claim 4, wherein the controller calculates viscosity of the oil according to oil temperature in an engine stop mode and operates the electric oil pump in a low power state according to the calculated viscosity of oil.

7. The oil pump control apparatus of claim 4 wherein the oil pump is an electric oil pump.

8. A non-transitory computer readable medium containing executable program instructions executed by a processor, comprising:
program instruction that control a line pressure by operating an electric oil pump at a maximum power in response to a starting demand for a hybrid vehicle being detected;
program instructions that calculate a viscosity to correspond to an oil temperature in an engine stop mode and control a rotation speed of the electric oil pump in a low power state in response to the calculation; and
program instructions that calculate a viscosity according to a variation in the line pressure in a driving mode and control the rotation speed of the electric oil pump to either a low power, a middle power, or a high power state.

* * * * *